Patented July 14, 1942

2,290,130

UNITED STATES PATENT OFFICE 2,290,130

STABLE SOLUTION FOR PRODUCING ICE COLORS

Robert Prescott Parker, Somerville, and Robert Carland Conn, Bound Brook, N. J., assignors to American Cyanamid Company, New York, N. Y., a corporation of Maine No Drawing. Application June 7, 1940,
Serial No. 339,324

6 Claims. (Cl. 8—45)

This invention relates to the preparation of solutions of ice color compositions and more particularly to a method for the production of stable solutions suitable for producing ice colors on the fiber.

One of the most satisfactory methods of producing insoluble azoic colors or ice colors on textile material, particularly in printing on cotton and regenerated cellulose material, is a process wherein a diazotized ice color component stabilized against azoic coupling in alkaline medium and an ice color coupling component, both contained in an alkaline composition such as a paste, solution, or the like are applied to the fiber and then treated with a weak acid to develop the color directly on the fiber. Compositions of this kind are available on the market either in the form of powders or solutions.

If the ice color compositions are stored in the powder form, there is less tendency for the diazo compound to decompose or for premature coupling to occur. However, the powder must be dissolved to form the printing paste and care must be taken that this solution is complete or uneven prints will be obtained. Furthermore, there is danger that the powder is contaminated with dirt or grit which must be removed before the paste is applied to the engraving roll. Therefore, the preparation of a printing paste from the powder entails several conditioning steps. These disadvantages would be avoided by marketing the compositions in the form of alkaline solutions. However, such solutions are rather unstable. The diazo compound decomposes over a period of time with evolution of nitrogen so that there is a danger of pressure developing in the container. Furthermore, premature formation of the dye may occur which leads to turbid solutions or the formation of a sediment. As a result of this deterioration, the intensity of the color developed on the fiber falls off and instead of the bright shades possible with fresh solutions, the color becomes progressively duller if the solutions are kept over long periods of time. When printing gums are incorporated in solutions which have undergone such deterioration, precipitates are formed and a granular paste results.

According to the present invention we have found that when reducing sugars are incorporated into the solutions or pastes, their stability is greatly increased so that the solutions can be stored over long periods of time without danger of nitrogen evolution from the diazo compound, discoloration of the solution, sedimentation, or other detrimental results such as were previously encountered. The protective action of these sugars makes it possible for the solutions to maintain their full printing qualifications as to strength and brightness of prints produced over a period of months.

In preparing the solutions of the present invention, a diazo compound stabilized against azoic coupling in alkaline medium by reaction with guanyl urea-N-sulfonic acid, and the coupling component are dissolved in an aqueous solution of a strong base such as caustic alkali, a quaternary ammonium base, or mixtures of bases. An alcohol such as glycol ethyl ether, glycol butyl ether, butanol, cyclohexanol, etc. may be added to aid dissolution. A quantity of a reducing sugar such as maltose, lactose, d-glucose, d-fructose, d-galactose, l-arabinose, l-xylose, or a mixture such as invert sugar is then incorporated in the solution. The amount of sugar required to effect stabilization varies with the particular solution employed and the quantity is not a critical factor of our invention. We have found, however, that when a monose and stabilized diazo compound are in approximately equimolecular proportion, excellent stability results in the case of most dye compositions.

The invention is applicable broadly to any ice color producing composition containing diazotized ice color components stabilized with guanyl urea-N-sulfonic acid. The diazo compound may be any diazotized amine or tetrazotized diamine suitable for producing ice colors. Thus the following diazo or tetrazo components are useful: aniline, its homologues, their halogen, nitro, alkoxy, aryloxy, acylamino, sulfon, sulfonamid, and cyano derivatives, xenylamine, the naphthylamines, heterocyclic amines such as amino fluorenes, amino azo compounds, etc. Furthermore, diamines in which one of the amino groups only can be diazotized such as 2,6-dichloro-1,4-phenylene diamine can be employed. Diamines in which both amino groups can be diazotized, e. g. benzidine, derivatives of 4,4'-diamino stilbene can be used. If the amino compound contains more than one substituent, these may be either the same or different such as for example 2-methoxy-5-chloroaniline.

The coupling components used in the stable ice color producing compositions are the usual ice color coupling components such as the naphthols, pyrazolones, hydroxy-benzo fluorenones, benzoylnaphthols, and various N-substituted amides, particularly arylides of 2-hydroxy-3-anthroic acid, of methyl and dimethyl salicylic acids, of hydroxy-carbazole-carboxylic acids, of hydroxy-benzo carbazole-carboxylic acids, of aceto-acetic acid, of furoylacetic acid, of terephthaloyl-bis-acetic acid, of hydroxy-dibenzofuran-carboxylic acids, of hydroxy-dibenzothiophene carboxylic acids etc.

The reducing sugars of the present invention can be advantageously employed in any solution of the kind referred to in order to effect stabilization. When the solution is stabilized by the action of a quaternary ammonium base such as described and claimed in the copending application of Lecher and Parker, Ser. No. 284,704, filed July 15, 1939, and a reducing sugar added, a composition of maximum stability results. However, it is not essential that a quaternary ammonium base be present as the action of the reducing sugars is independent of the other stabilizing agents, but it is an advantage that it may be used to enhance the stabilization of ice color producing compositions containing various other stabilizers.

The invention will be further illustrated by the following examples which show typical ice color compositions stabilized according to the present invention. It is intended that they be illustrative only and in no way limit the scope of the invention which broadly includes solutions of ice color compositions stabilized with reducing sugars. The parts are by weight.

*Example 1*

A solution of the following composition:

| | Parts |
|---|---|
| The disodium salt of the product obtained by condensing diazotized 2-methyl-5-chloroaniline with guanyl urea-N-sulfonic acid (76.5% purity) | 13.20 |
| The o-toluidide of 2-hydroxy-3-naphthoic acid | 7.68 |
| 1-xylose | 4.00 |
| Monobutyl ether of ethylene glycol | 11.50 |
| Sulfonated castor oil | 0.50 |
| Tetra (beta-hydroxyethyl) ammonium hydroxide (39.5% aqueous solution) | 32.55 |
| Water | 30.57 |
| | 100.00 | is prepared by making a slurry of the above-mentioned stabilized diazo product, naphthol, and 1-xylose in the ethylene glycol mono-butylether, stirring and adding in the order named: the sulfonated castor oil, the tetra (beta-hydroxyethyl) ammonium hydroxide aqueous solution, and finally water. Stirring is continued until a clear solution is obtained whereupon it is clarified by filtration.

When 25 parts of this solution are diluted with five parts of water and 70 parts of a suitable thickener such as starch paste are added, a paste suitable for printing is obtained. This paste is printed on cotton piece goods from an engraved copper roll and the print is dried. The dry print is developed with live steam containing acetic acid vapors, the developed print is rinsed, soaped at elevated temperature, rinsed and dried. A bright red print is obtained.

When this solution is stored at room temperature for one month in comparison with a similarly prepared solution not containing 1-xylose, it remains noticeably lighter and cleaner in appearance, showing that there is less decomposition and the solution evolves very markedly less nitrogen over this period of time.

Very similar results are obtained if the 1-xylose is substituted by d-glucose, 1-arabinose, d-fructose, d-galactose, or maltose, the formulation remaining otherwise the same.

*Example 2*

A solution is prepared in accordance with Example 1 except that 1-xylose is replaced by 4.00 parts of dextrose as a protective agent and tetra (beta-hydroxyethyl) ammonium hydroxide is replaced by 22.60 parts of a 39.8% aqueous solution of methyl tri (beta-hydroxyethyl) ammonium hydroxide. The stability as regards rate of nitrogen evolution is quite similar and the solution on standing remains clear and free from sediment.

*Example 3*

A solution of the following composition:

| | Parts |
|---|---|
| The di-potassium salt of the product obtained by the condensation of diazotized 2-methoxy-5-chloroaniline with guanyl urea N-sulfonic acid (90.6% purity) | 14.40 |
| The o-anisidide of 2-hydroxy-3-naphthoic acid | 9.40 |
| Corn syrup | 4.00 |
| Mono-butyl ether of ethylene glycol | 18.00 |
| Tetra (beta-hydroxyethyl) ammonium hydroxide as a 52.2% aqueous solution | 25.90 |
| Water | 28.30 |
| | 100.00 | is prepared by making a slurry of the above-mentioned stabilized diazo product and naphthol in the ethylene glycol monobutylether, stirring and adding, in the order named, the tetra (beta-hydroxyethyl) ammonium hydroxide, the corn syrup and finally the water. Stirring is continued until a clear solution is obtained whereupon the solution is filtered.

This solution is converted to a print paste and is printed as described in Example 1. When the dry, unfinished print on cotton piece goods is developed with live steam containing acetic acid vapors and the developed print is rinsed, soaped at elevated temperatures, rinsed and dried, a strong bluish red print is obtained.

When the above-described solution is stored at room temperature for a long period, it evolves considerably less nitrogen than a similar solution stored under identical conditions and containing no corn syrup. Further, the solution remains cleaner and lighter in color than does the one containing no corn syrup.

*Example 4*

A solution of the following composition:

| | Parts |
|---|---|
| The disodium salt of the product obtained by the condensation of diazotized 2-methyl-5-chloroaniline with guanyl urea-N-sulfonic acid (76.4% purity) | 11.52 |
| The o-phenetidide of 2-hydroxy-3-naphthoic acid | 7.50 |
| Dextrose | 4.00 |
| Mono-butylether of ethylene glycol | 16.00 |
| Tetra (beta-hydroxyethyl) ammonium hydroxide as a 52.2% aqueous solution | 20.10 |
| Water | 40.88 |
| | 100.00 | is prepared by making a slurry of the above-mentioned stabilized diazo product, naphthol and dextrose in the ethyleneglycolmono-butyl ether, stirring and adding the tetra (beta-hydroxyethyl) ammonium hydroxide and finally the water is added and stirring continued until a clear solution is obtained whereupon the solution is filtered.

This solution may be printed in a manner in accordance with the procedure used for printing the solution prepared in Example 1. When the dry, unfinished print on cotton piece goods is developed with live steam containing acetic acid vapors and the developed print is rinsed, soaped at elevated temperature, rinsed and dried, a bright scarlet print is obtained.

When the above-described solution is permitted to stand for several months at room temperature, it evolves a considerably smaller volume of nitrogen gas than a similar solution containing no dextrose. It further remains cleaner and lighter in appearance and the keeping quality with regard to dye formation is materially improved.

Example 5

| | Parts |
|---|---|
| The disodium salt of the product derived from diazotized 2-methyl-5-chloroaniline and guanyl urea-N-sulfonic acid (86% purity) | 94.00 |
| 2-hydroxy-3-naphthoic acid ortho-toluidide | 61.40 |
| Hexahydrophenol | 90.50 |
| Diethylene glycol mono-butyl ether | 144.00 |
| Sulfonated castor oil | 24.00 |
| Dextrose | 32.00 |
| Sodium hydroxide (17.04%) | 97.00 |
| Water | 257.00 |
| | 799.90 |

The 2-hydroxy-3-naphthoic acid ortho-toluidide and the dextrose are slurried in a mixture of hexahydrophenol, diethylene glycol mono-butyl ether and the sulfonated castor oil. The sodium hydroxide solution is added, and the mixture well stirred and water added. When this mixture is well stirred, the stabilized diazo is dissolved. When the components are completely dissolved, the solution is clarified by filtration.

When 20 parts of this solution are converted into a printing paste and printed on cotton piece goods according to the procedure described under Example 1, a brilliant red pattern of excellent fastness properties is obtained.

When this solution is stored in a suitable container over a period of some months, it remains clear without formation of sediment. The solution compared to one identically prepared without addition of an active reducing sugar shows a very marked decrease in the rate of nitrogen evolution. Because of these increased stability properties, the solution retains over a period of some months the original strong bright shade obtained by the application procedure described.

Example 6

When a solution is prepared in accordance with Example 1, except that a mixture of 10.05 parts of a 52.2% aqueous solution of tetra (beta-hydroxyethyl) ammonium hydroxide and 4.12 parts of a 24% aqueous solution of sodium hydroxide are used in place of tetra (beta-hydroxyethyl) ammonium hydroxide alone, very similar results are obtained with regard to nitrogen evolution from the solution, clarity of solution and stability with regard to dye formation.

We claim:

1. An aqueous solution comprising an ice color diazo compound stabilized by reaction with guanyl urea-N-sulfonic acid, an ice color coupling component and an amount of reducing sugar sufficient to enhance the stability of the solution, the composition being sufficiently alkaline to prevent azoic coupling of the components.

2. An aqueous solution comprising an ice color diazo compound stabilized by reaction with guanyl urea-N-sulfonic acid, an ice color coupling component, an amount of reducing sugar sufficient to enhance the stability of the solution and an alcohol, the composition being sufficiently alkaline to prevent azoic coupling of the components.

3. An aqueous solution comprising an ice color diazo compound stabilized by reaction with guanyl urea-N-sulfonic acid, an ice color coupling component, a quaternary ammonium base containing at least one alkyl group with at least one hydroxyl radical, and an amount of reducing sugar sufficient to enhance the stability of the solution.

4. An aqueous solution comprising an ice color diazo compound stabilized by reaction with guanyl urea-N-sulfonic acid, an ice color coupling component, a quaternary ammonium base containing at least one alkyl group with at least one hydroxyl radical, an amount of reducing sugar sufficient to enhance the stability of the solution and an alcohol.

5. An aqueous solution comprising the ortho toluidide of 2-hydroxy-3-naphthoic acid, the disodium salt of the reaction product of diazotized 2-methyl-5-chloroaniline with guanyl urea-N-sulfonic acid, tetra (beta-hydroxyethyl) ammonium hydroxide, an amount of reducing sugar sufficient to enhance the stability of the solution and an alcohol.

6. An aqueous solution comprising the ortho phenetidide of 2-hydroxy-3-naphthoic acid, the disodium salt of the reaction product of diazotized 2-methyl-5-chloroaniline with guanyl urea-N-sulfonic acid, tetra (beta-hydroxyethyl) ammonium hydroxide, an amount of reducing sugar sufficient to enhance the stability of the solution and an alcohol.

ROBERT PRESCOTT PARKER.
ROBERT CARLAND CONN.